UNITED STATES PATENT OFFICE.

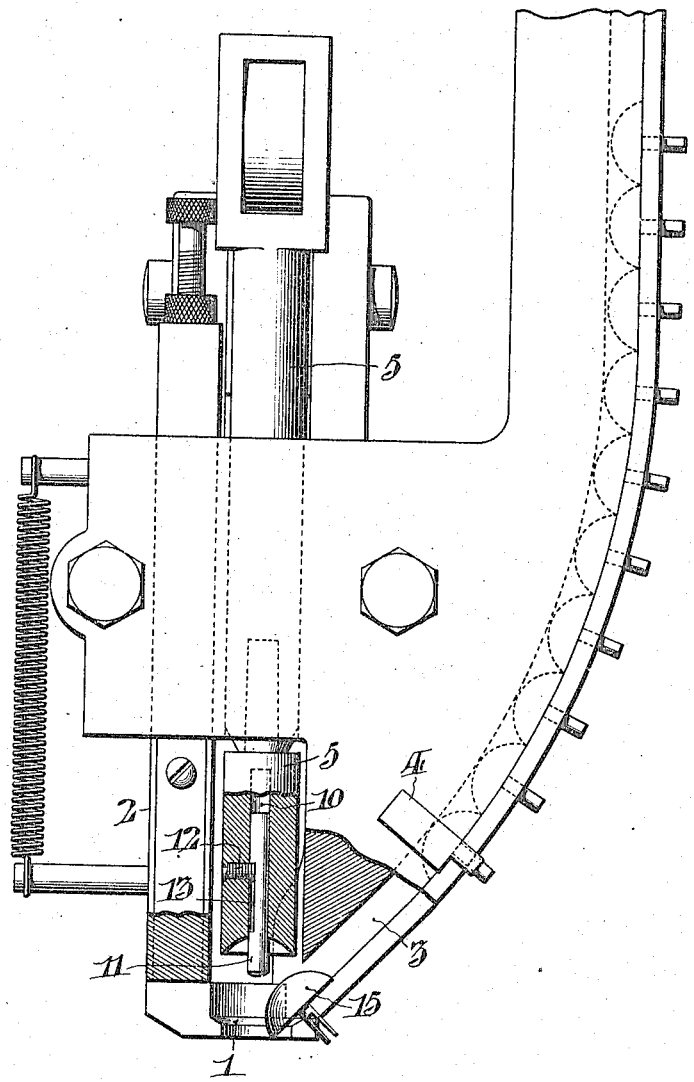
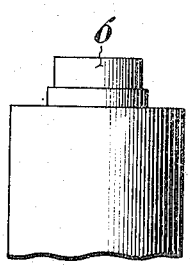

JAMES W. COOMBS, OF WOLLASTON, MASSACHUSETTS, ASSIGNOR TO PENN RIVET MANUFACTURING COMPANY, INCORPORATED, OF PHILADELPHIA, PENNSYLVANIA, A CORPORATION OF PENNSYLVANIA.

RIVET-SETTING MACHINE.

1,128,852.  Specification of Letters Patent.  Patented Feb. 16, 1915.

Application filed April 23, 1914. Serial No. 833,856.

*To all whom it may concern:*

Be it known that I, JAMES W. COOMBS, of Wollaston, in the county of Norfolk and State of Massachusetts, have invented certain new and useful Improvements in Rivet-Setting Machines, whereof the following is a specification, reference being had to the accompanying drawings.

My invention relates to a machine by which large head rivets, such for example as are used to protect the bottom of suit cases, are set in place, by driving the shank of the rivet through the leather and expanding the split shank upon an anvil. In such machines there is provided a conical seat to which a rivet is fed and whereon it rests until the descent of a plunger centers and drives it. By my device I have provided a simple and novel means of effectually centering the rivet before it is driven. The same means prevent the possible inversion of the rivet upon the seat as sometimes occurs if the rivet is top-heavy. To this end my invention provides a pin or finger, freely mounted within the axis of the plunger, and hanging by its own weight to a short distance above the top of the rivet. This pin bears such relation to the path taken by the rivets, as they pass from the race-way to the seat, that the pin will be clear of contact from the rivet, when it is seated in proper position. As the plunger descends the retreating pin exerts enough pressure to center the rivet before the plunger strikes and drives it. The pin also effectually prevents the improper inversion of the rivet.

In the accompanying drawing, the figure shows in elevation the essential parts of such a machine having my invention applied thereto.

Describing first those parts of the machine which are old and well known, it will be observed that the machine is provided with a cup-shaped rivet seat 1, formed upon a carrier 2. The seat and carrier are cloven so as to permit each half to retreat as the plunger descends. Leading to one side of this seat is a race-way 3, provided a short distance from its lower end with a separator 4. By this separator the stream of rivets coming down the race-way is checked, and individual rivets are tolled off and permitted to descend one at a time to the seat. A plunger 5, having a concave lower end is suitably mounted for vertical reciprocation as well known in this art. Directly below the seat and in line with the plunger is the anvil 6.

Referring specifically to the parts which are of my invention, it will be observed that the plunger is bored axially to provide a central channel 10. Within this channel is mounted, with capacity for free vertical play, the pin 11. The movement of this pin is limited by the set screw 12, received within the flattened recess 13, on one side of the pin, but except for this limitation the pin hangs only by its own weight. The limit is so set that when the plunger is elevated, the lower end of the pin, which may be slightly rounded as shown, depends a short distance below the lower end of the plunger, directly over and in line with the axis of the seat and the anvil.

In the drawing, the rivet 15, is shown passing from the race-way to the seat. In normal operation, this rivet slides into its seat without coming into contact with the lower side of the plunger, or the depending pin 11. When the rivet has thus seated itself, the lower end of the pin 11, is elevated an appreciable distance, say about a quarter of an inch, above the crown of the rivet.

If the rivet as it slides into the seat, rests properly seated beneath the plunger, my device has no function to perform, and the pin merely retreats within the plunger as it descends to drive the rivet, being under such circumstances merely a harmless inoperative adjunct. But more usually the rivet does not come to rest exactly in the center of the seat. Heretofore the concave lower end of the plunger has been relied upon to perform both the centering and the driving operation, and this it does although the rapidity of its motion causes the operation of centering the rivet within its seat, to be performed somewhat harshly, sometimes with a slight distortion of the rivet. By the use of my invention, as the plunger descends, the lower end of the pin first contacts with the top of the rivet resting upon it by its own weight. Owing to the rounded shape of the seat upon which the rivet rests, this slight weight is sufficient in itself to push the rivet into a central position, which it accomplishes before the lower end of the plunger actually reaches the rivet, and begins to drive it. In this way sufficient time is provided to permit the centering operation to be completed before the driving operation by the plunger begins. As a result of which I find that the rivet is more perfectly and accurately driven with less strain to the rivet.

My device also performs another useful function. The rivet before coming to rest upon the seat, is subjected to jars or tremors, which tend to cause a top-heavy rivet to sometimes invert unless means are provided to prevent this. The position of the pin 11, directly over the top of the rivet, is such that the top of the rivet will come into contact with the end of this pin, before it can turn over, and the pin has sufficient weight and is so situated as to prevent such inversion of the rivet.

It is characteristic of my invention that the pin 11, hangs freely with capacity for vertical motion only directly over the center of the crown of the rivet, whereby it is efficacious to properly seat a bounding rivet, no matter from what direction the tendency of the rivet to invert may exert itself.

Having thus described my invention, I claim:

1. In a rivet setting machine, the combination of the plunger having an axial recess, the rivet seat, a race-way leading thereto, and a pin freely received within the axial recess in the plunger and protruding below its lower edge when the plunger is raised, but with capacity of retreating within the recess upon contact with a rivet as the plunger descends.

2. In a rivet setting machine, the combination of the plunger having an axial recess, the rivet seat, a race-way leading thereto, and a pin freely received within the axial recess in the plunger and protruding sufficiently below its lower edge to prevent a rivet passing from the race-way to the seat from inverting itself, but with capacity of retreating within the recess when the plunger descends upon the rivet.

In testimony whereof, I have hereunto signed my name at Philadelphia, Pennsylvania, this twenty-first day of April, 1914.

JAMES W. COOMBS.

Witnesses:
　JAMES H. BELL,
　E. L. FULLERTON.